United States Patent [19]
Dange et al.

[11] Patent Number: 5,580,121
[45] Date of Patent: Dec. 3, 1996

[54] VEHICLE BODY REAR SUPPORT ARRANGEMENT

[75] Inventors: Milind M. Dange, Farmington Hills; Stuart A. Ehrhardt, Davisburg; Kevin L. Young, New Baltimore; David M. Grylls, Grosse Pointe; Dattarey N. Gawaskar, Farmington Hills, all of Mich.

[73] Assignee: Chrysler Corporation, Auburn Hills, Mich.

[21] Appl. No.: 574,808

[22] Filed: Dec. 19, 1995

[51] Int. Cl.⁶ ............................................. B60R 27/00
[52] U.S. Cl. ..................... 296/186; 296/195; 296/198; 296/204; 296/29
[58] Field of Search .................... 296/186, 195, 296/198, 203, 204, 29

[56] References Cited

U.S. PATENT DOCUMENTS

| | | | |
|---|---|---|---|
| 4,234,225 | 11/1980 | Harasaki et al. | 296/185 |
| 4,516,803 | 5/1985 | Kaltz et al. | 296/107 |
| 5,018,780 | 5/1991 | Yoshii et al. | 296/203 |
| 5,102,186 | 4/1992 | Yoshii et al. | 296/195 |
| 5,110,177 | 5/1992 | Akio | 296/189 |
| 5,114,184 | 5/1992 | Shimomura et al. | 280/784 |
| 5,207,453 | 5/1993 | Stedman et al. | 280/808 |
| 5,350,214 | 9/1994 | Yamauchi et al. | 296/204 |
| 5,364,128 | 11/1994 | Ide | 280/784 |
| 5,382,044 | 1/1995 | Smith et al. | 280/673 |

Primary Examiner—David M. Mitchell
Assistant Examiner—Jonathan J. Yun
Attorney, Agent, or Firm—Thomas G. Pasternak

[57] ABSTRACT

An open-top vehicle rear cross car beam body support arrangement for an open-top vehicle having a passenger compartment defined in part by a front floor pan ending in an elevated rear floor pan together with right and left rear inner wheelhouse panels. The beam arrangement includes forming each wheelhouse panel upper inboard portion with a recessed step defining opposed upstanding riser portions each having a lower edge terminating in an inboard extending tread portion. An upper horizontal gusset panel of the beam is welded to upper portions of spaced apart front and rear downstanding gusset panels, while lower flanges of the front and rear gusset panels are welded to the rear floor pan forming a closed section cross beam. The outboard ends of the upper gusset panel terminate in connector portions, each formed with an upstanding shroud having a top panel defined by fore and aft downstanding side walls together with an inboard wall. Each shroud, welded together with its associated underlying wheelhouse tread and riser portions, define a box-shaped stiffener enclosing a pair of upstanding strut fastener receiving spacers. The spacers, in combination with their stiffener, are adapted for transferring their associated strut loads to the cross beam, thereby minimizing the transmission of road noise into the passenger compartment.

7 Claims, 7 Drawing Sheets

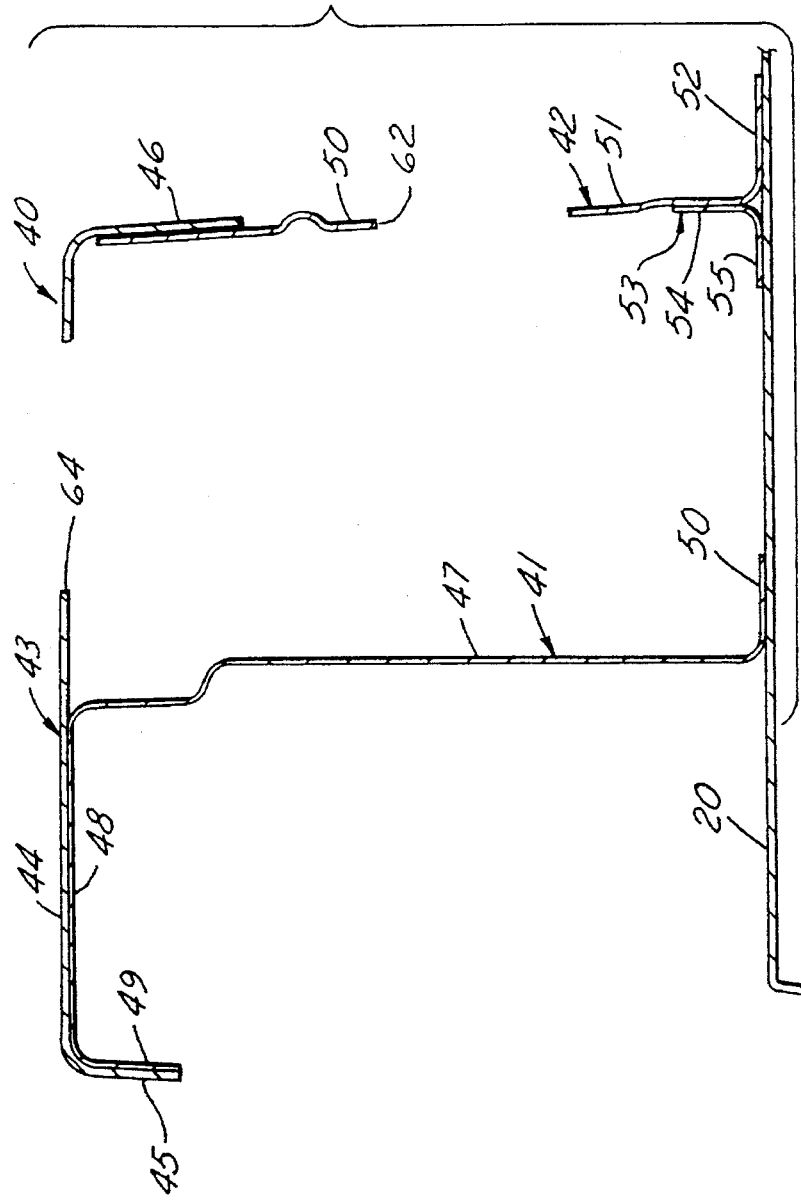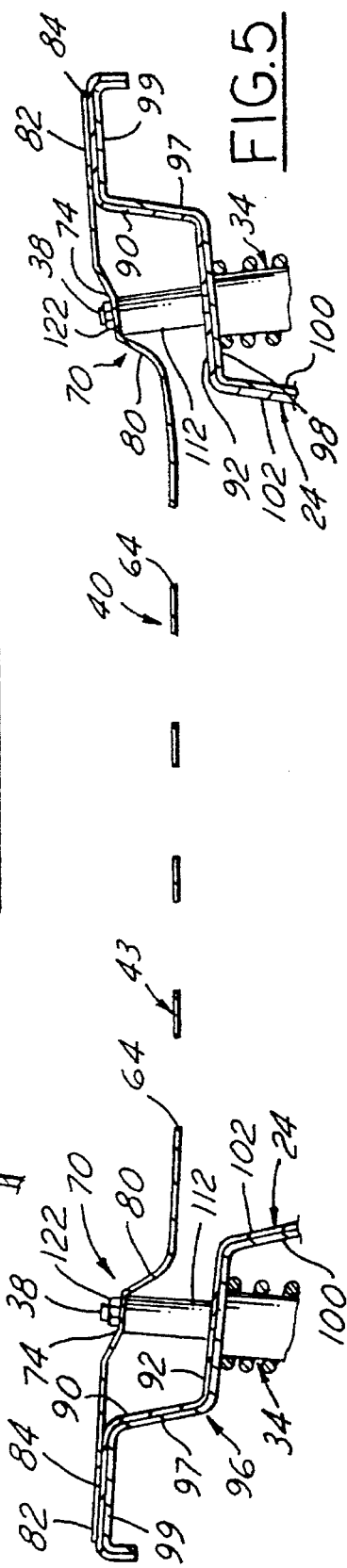

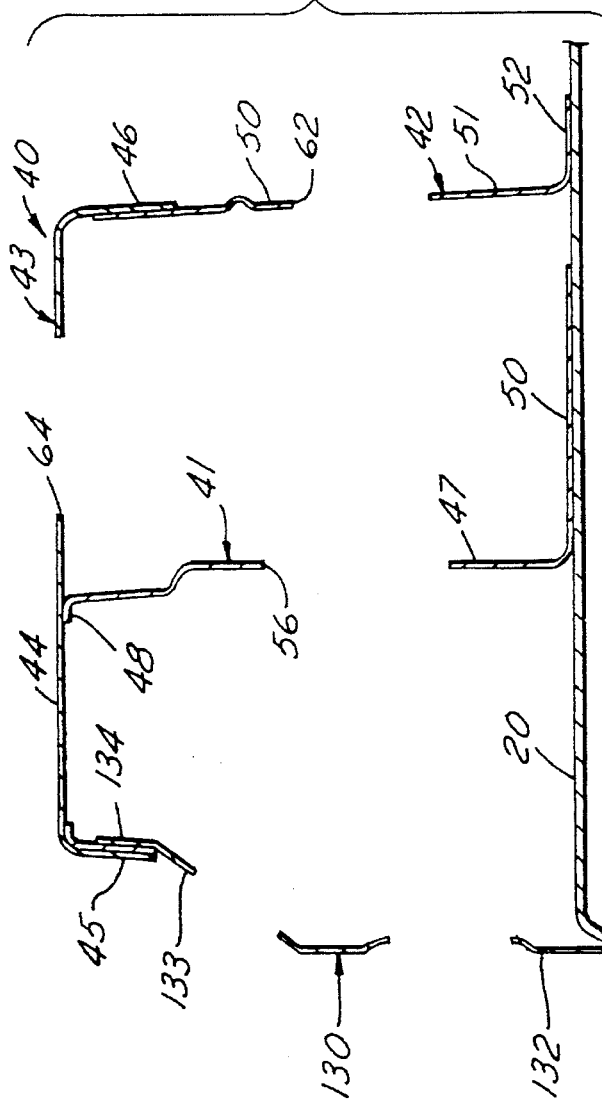
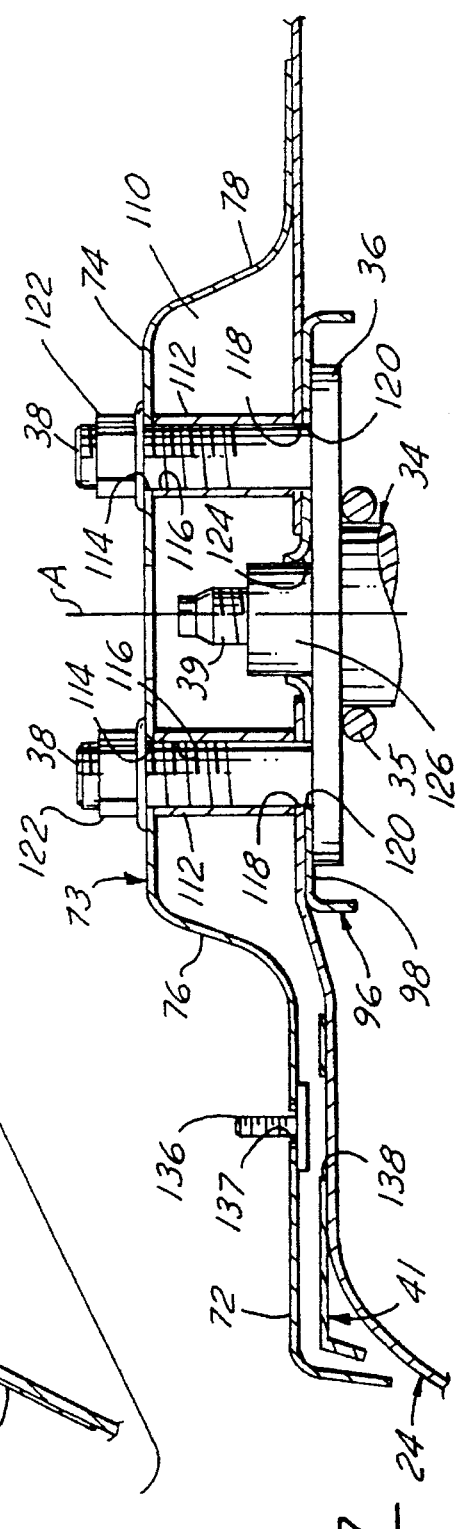
FIG. 6
FIG. 7

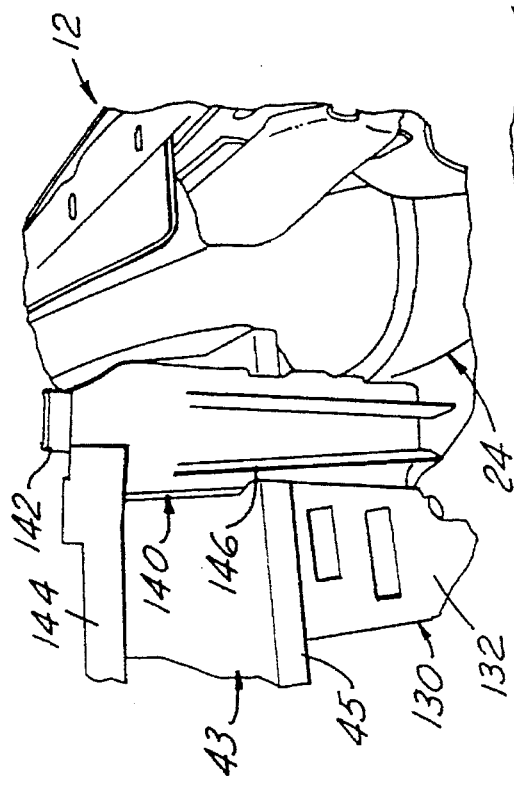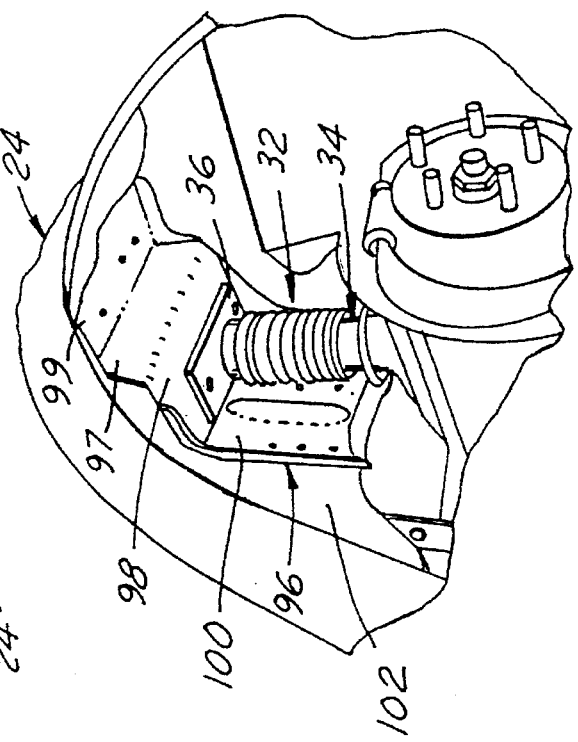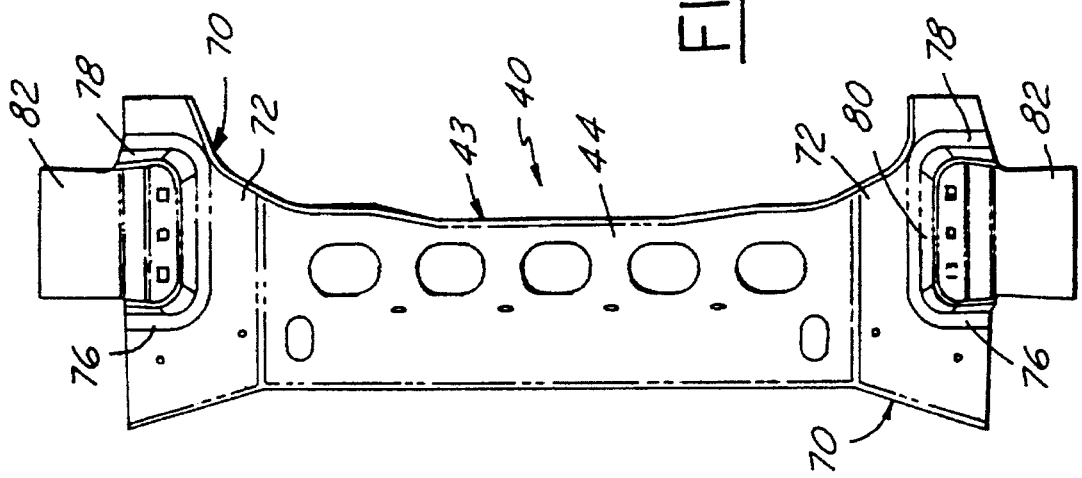

VEHICLE BODY REAR SUPPORT ARRANGEMENT

FIELD OF THE INVENTION

This invention relates to vehicle body structures and, more particularly, to a cross car beam arrangement providing improved stiffness for open-top vehicle bodies and the like.

BACKGROUND OF THE INVENTION

It is known in the art relating to open-top vehicles to provide a cross car beam having its ends supported between strut mounting towers upstanding from associated right and left rear wheelhouse panels. As a result, a major portion of the rear suspension strut loads are transferred from their associated strut towers to the cross car beam. It will be appreciated, however, that such strut towers increase the overall interior space occupied by the enlarged rear wheelhouses thereby limiting the available space for adjacent components, such as a convertible top storage well. Further, such upstanding rear strut towers restrict the vehicle design with respect to lowering the body exterior styling lines.

SUMMARY OF THE INVENTION

It is a feature of the present invention to provide a convertible-type vehicle cross car beam arrangement wherein the beam outboard ends are formed with attachment portions for securing each beam to an associated rear inboard wheelhouse panel such that the attaching portions are located no higher than the uppermost level of the wheelhouses.

It is another feature of the present invention to provide a cross car beam arrangement for improving the stiffness and durability of an open-top vehicle body structure wherein each beam end attachment portion is integrated into its associated wheelhouse inboard panel resulting in sufficient interior space for vehicle components, such as a storage well structure for a lowered convertible top.

It is still another feature of the present invention to provide a cross car beam arrangement, as discussed above, which includes structure for fixedly securing a lower portion of a shoulder belt supporting pillar positioned at each rear corner of the passenger compartment.

It is yet another feature of the present invention to provide a cross beam support arrangement for an open-top vehicle body subjected to road inputs through rear suspension strut assemblies which transfers the strut loads into the cross beam while minimizing the transmission of road noise into the passenger compartment.

It is still another feature of the present invention to provide a cross car beam support arrangement for a convertible-type vehicle body, wherein each end attachment portion of the beam is uniquely inter-connected to its associated rear wheelhouse inboard panel. Each wheelhouse panel uppermost inner portion is formed with a recessed step including opposed riser portions, each having a lower end terminating in an inboard extending tread portion, and wherein each end attachment portion is formed with an upstanding shroud having a top panel in spaced overlying relation to its associated tread. The top panel is defined by fore and aft downstanding side walls together with an inboard wall, while the top panel terminates in an outboard extending cap flange welded to an uppermost portion of its associated wheelhouse panel. Each shroud, in combination with its associated wheelhouse panel step tread and riser, define a box-shaped stiffener adapted for transmitting its rear wheel suspension strut loads to the cross car beam.

These and other features and advantages of the invention will be more fully understood from the following detailed description of the invention taken together with the accompanying drawings.

BRIEF DESCRIPTION OF THE DRAWINGS

In the drawings:

FIG. 4 is an enlarged fragmentary vertical sectional view taken on the line 4—4 of FIG. 1;

FIG. 5 is an enlarged fragmentary vertical sectional view, partly in elevation, taken on the line 5—5 of FIG. 1;

FIG. 6 is an enlarged fragmentary vertical sectional view taken on the line 6—6 of FIG. 1;

FIG. 7 is an enlarged fragmentary vertical sectional view taken on the line 7—7 of FIG. 1;

FIG. 9 is a detail top view of the cross-car beam upper main member shown in FIG. 8;

FIG. 10 is a fragmentary perspective view of the interior of one rear wheelhouse showing a reinforcement bracket of the present invention; and FIG. 11 is a fragmentary perspective view of the passenger compartment left rear corner showing a rear passenger shoulder belt support pillar.

DETAILED DESCRIPTION OF THE INVENTION

Figure 1:
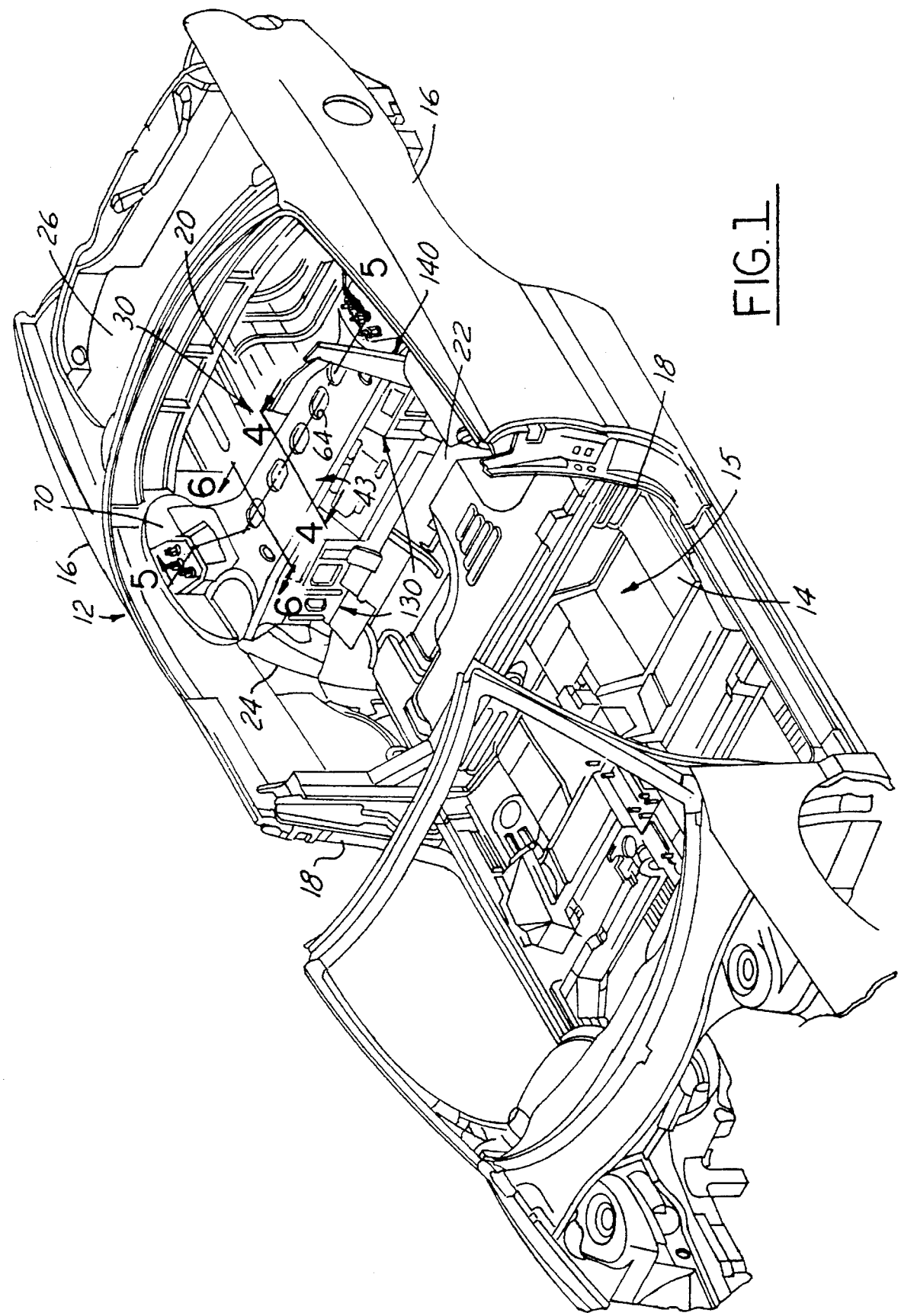
FIG. 1 is a fragmentary perspective view of an open-top vehicle body to which the present invention has been applied.

Referring now to the drawings in detail, numeral 12 in FIG. 1 generally indicates a convertible-type or open-top vehicle body provided with a front sheet metal floor pan 14, constituting the bottom portion of a passenger compartment 15. A pair of right and left rear fender panels 16 establish an outer surface of a side body portion rearward of right and left door openings 18. The front floor pan 14 terminates in an elevated rear floor pan 20 connected by a rearwardly and upwardly extending kick-up pan portion 22. A pair of inboard bulging right and left wheelhouse panels, shown best at 24 in FIG. 2, extend along an aft portion of the passenger compartment which terminates in a rear storage trunk 26.

Figure 2:
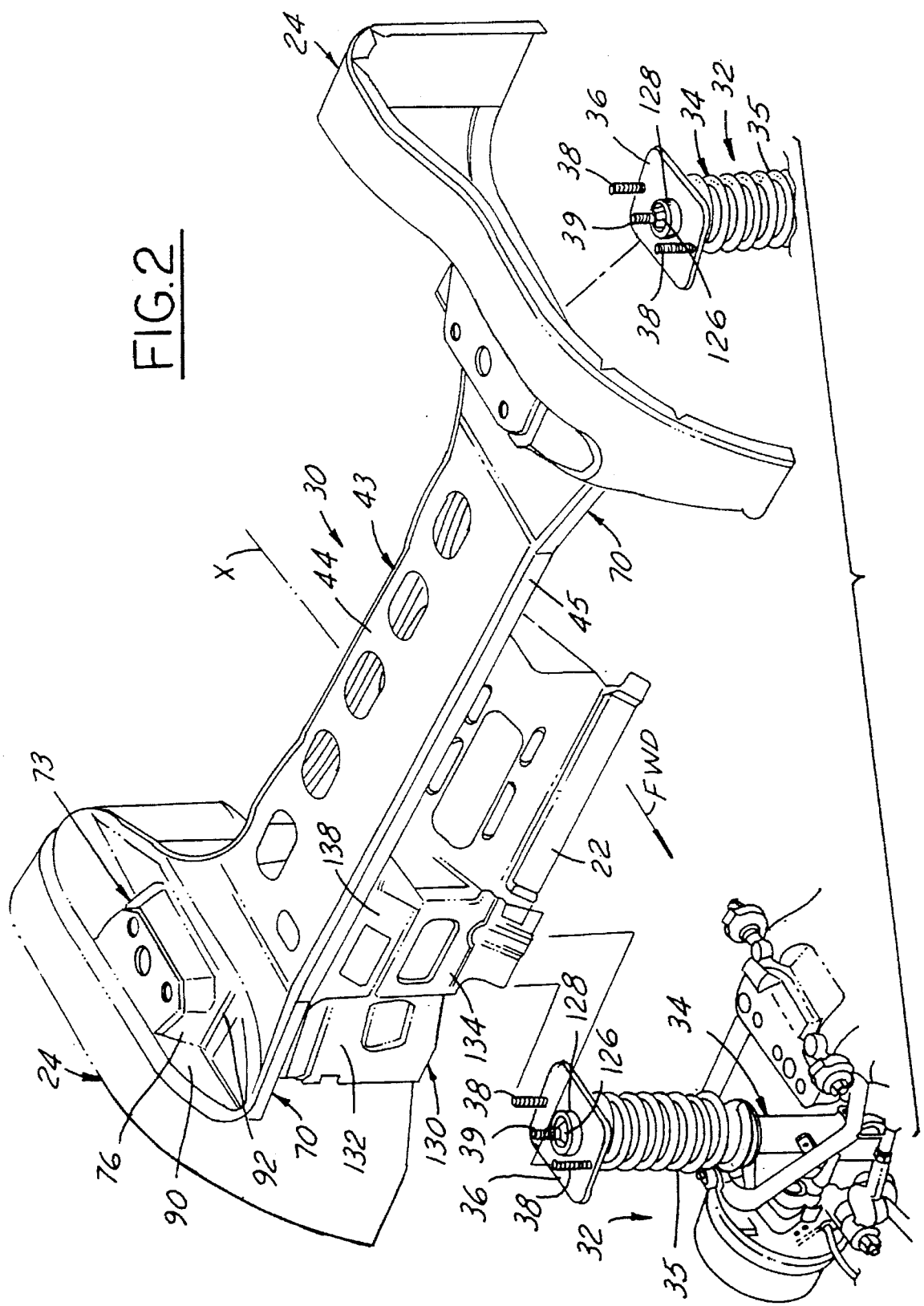
FIG. 2 is a fragmentary perspective exploded view of a rear portion of the vehicle body of FIG. 1 showing details of the rear suspension supported by the present invention.
Figure 3:
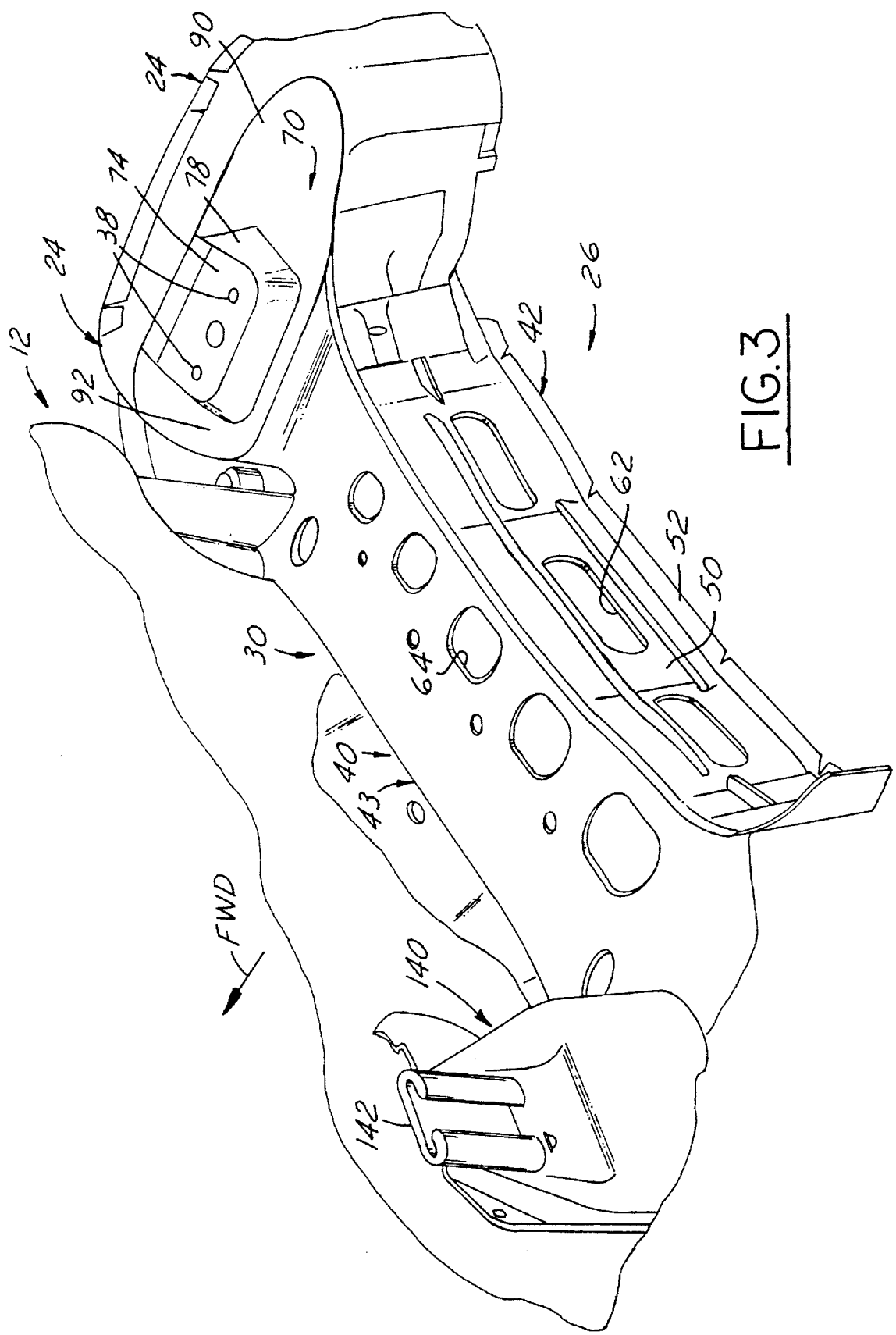
FIG. 3 is a fragmentary perspective view looking forward from the vehicle rear storage trunk showing details of the cross beam rear gusset panel and shoulder belt support pillar.

With reference to FIG. 2, a structural cross car beam assembly, generally indicated at 30, is shown extending transversely between the pair of wheelhouse panels 24. The beam assembly 30, symmetrically disposed about vehicle longitudinal centerline axis "X", has each end portion fixedly secured to an associated wheelhouse panel 24. Right and left rear wheel suspension strut assemblies, each indicated generally at 32, include an upstanding shock strut 34 surrounded by a coil spring 35. Each shock strut 34 has a mounting plate 36 on its upper end adapted for mounting to an associated wheelhouse panel 24. Each plate 36 supports a pair of upstanding fore and aft threaded bolt studs 38 together with a center strut stem 39, shown in FIG. 7 aligned on strut axis "A". Each pair of studs 38 and their center strut stem 39 are adapted to be received in respective mounting holes, in a manner to be described.

Figure 8:
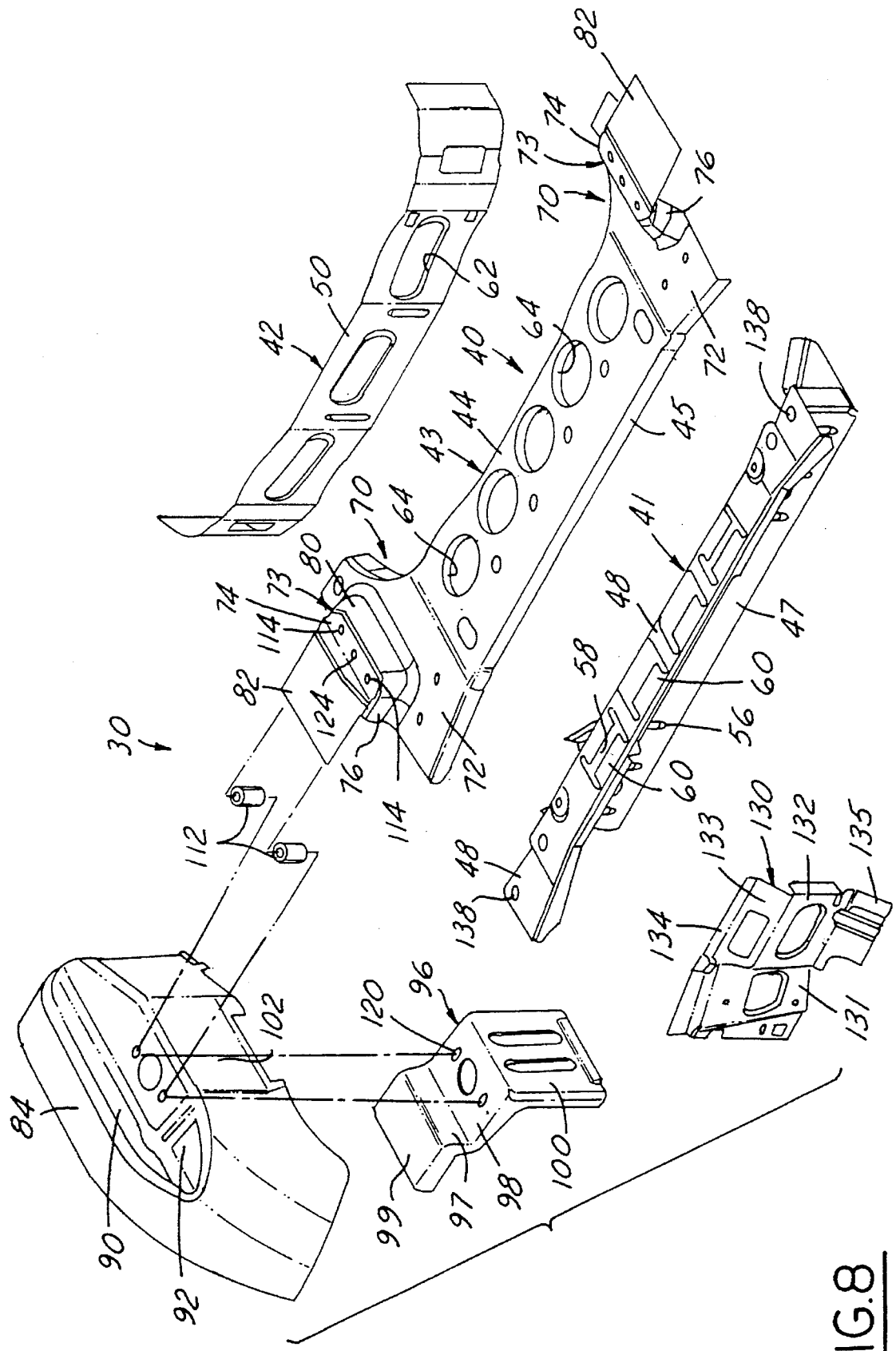
FIG. 8 is an exploded perspective view of the cross car beam and an associated right hand vehicle body wheelhouse of the present invention.

As seen in FIG. 8, the cross car beam assembly 30 includes a main, horizontally disposed, transversely extending, upper gusset panel 40 together with front 41 and rear 42 gusset panels. FIGS. 4 and 6 show the vertically disposed longitudinally spaced apart front 41 and rear 42 gusset panels welded to an elongated central portion 43 of the upper gusset panel 40. The beam central portion 43 is in the shape of an inverted channel defined by horizontal bight portion 44 having its fore and aft edges defined by respective substantially ninety degree downturned front 45 and rear 46 flanges. The front gusset panel 41 has a generally Z-shape in cross section defined by vertical web 47 terminating at its upper edge in a forwardly extending doubler panel 48 terminating at its forward edge in a downturned reinforcing flange 49. FIG. 6 shows the front gusset panel 41 terminating at its bottom edge in a rearwardly extending horizontal trailing flange 50, adapted for welding to the rear floor pan 20.

The rear gusset panel 42 has an L-shaped cross section defined by an upstanding leg 51 terminating at its lower edge in a rearwardly extending trailing foot flange 52. The rear gusset panel is shown in FIG. 4 provided with a right-angle brace 53 defined by upstanding angle portion 55 welded to the rear gusset panel leg 51 and its horizontal angle portion 55 welded to rear floor panel 20. It will be noted in FIGS. 6 and 8 that the front gusset panel web 47 is formed with slotted openings 56 while its leading doubler panel 48 is formed with I-shaped openings 58. The I-shaped openings 58 define bendable flap portions 60 adapted to flex upwardly, if necessary, to provide face-to-face welding contact with the underside of the upper gusset panel bight portion 44. FIGS. 4 and 8 show elongated apertures 62 in the rear gusset panel 42 and upper circular holes 64 in the upper panel bight portion 44. Further, the front Z-shaped gusset doubler panel 48 is shown in FIG. 4 terminating in its downturned backing flange 49 for nested flush weld contact with upper gusset panel downturned flange 45.

With reference to FIGS. 8 and 9, the upper panel elongated central portion 43 is shown formed with integral mirror image right and left hand connector portions 70. FIG. 8 shows each beam connector portion 70 having an upwardly offset base panel 72 formed with an upstanding, generally rectangular-shaped shroud, generally indicated at 73. Each shroud is defined by a top panel 74, ending in fore 76 and aft 78 downstanding side walls and an inboard downstanding wall 80. The shroud top panel 74 outboard end terminates in an upwardly offset outwardly extending cap flange 82 adapted for overlying welded attachment with an underlying outboard planar portion 84 of its associated wheelhouse 24.

Referring to FIGS. 2 and 8, each rear inboard bulging wheelhouse panel 24 has its uppermost inboard portion formed with a recessed step. The wheelhouse mirror image steps define opposed upstanding riser portions 90, with each riser portion having its lower end terminating in an inboard extending tread portion 92. Upon the upper gusset panel connector portions 70 being secured to their associated wheelhouse panel 24, each shroud 73 is positioned, whereby their respective outboard facing open ends are closed by an associated step riser 90 and their respective open bottoms are closed by an associated step tread 92 as seen in FIG. 5.

As a result, each shroud 73 and its associated riser 90 and tread 92 cooperate to form a substantially closed stiffener box.

It will be seen in FIG. 8 that a double-L shaped exterior step reinforcement bracket 96, stamped from sheet metal, is adapted for welded attachment to the exterior surface of each wheelhouse panel recessed step. FIG. 5 shows each reinforcement bracket 96 providing conforming riser 90 and tread 92 backing plate portions 97 and 98, respectively, together with an outboard extending upper plate portion 99 and a downstanding lower plate portion 100. The bracket upper plate portion 99 is in backing relation to its associated wheelhouse panel upper outboard portion 84 while the lower downstanding plate portion 100 is in backing relation to its associated wheelhouse inner panel skirt portion 102.

As viewed in FIG. 7, each stiffener box 73 defines a cavity 110 in which a pair of cylindrical shaped sleeve spacer members 112, preferably of tubular steel, are symmetrically disposed on either side of the strut axis "A". The spacer members 112 are confined in an upright manner between their associated shroud top panel 74 and opposed step tread 92. Top panel openings 114, spacer axial passages 116, tread openings 118, and bracket lower backing plate portion openings 120 are aligned for receiving suspension strut plate and upwardly projecting threaded fasteners or studs 38, for retention by respective hex nuts 122. Further, tread flanged opening 124 receives strut plate upper threaded center fastener stem 39, shown in FIG. 2 retained by hex nut 126 and surrounded by an upstanding strut plate annular collar 128. It will be noted that each spacer member 112 has its upper end welded to the underside of the shroud top panel 74, while each spacer has a lower free end adapted for establishing a tolerance compensating gap. Upon tightening of the stud nuts 122, each spacer members lower end is drawn into flush compressed contact with the upper surface of step tread 92.

Referring to FIG. 1, it will be seen that the cross beam further includes forward right and left mirror image gusset closure panels 130. As seen in FIG. 2, each closure panel 130 is formed with a vertically disposed fold area, defining an outboard angled corner portion 131, welded to its associated wheelhouse panel 24, and a transversely extending upright forward portion 132. FIG. 8 shows the closure panel upright portion 132 has an upwardly and rearwardly inclined panel 133 ending in a vertically disposed upper weld flange 134 adapted for welded attachment to upper gusset panel front flange 45. The closure upright portion 132 has a downwardly and forwardly inclined flange 135 welded to the kick-up pan portion 22. It will be noted in FIG. 7 that a weld stud 136 extends through hole 137 in upper gusset panel attachment portion 70. The head of the weld stud 136 is welded to the underside of attachment portion by means of access opening 138 in cross beam front gusset panel apron flange 48.

With reference to FIG. 1 reference numeral 140 generally indicates right and left rear passenger shoulder belt structural support pillars disposed at each rear corner of the passenger compartment 15. FIG. 11 depicts the left rear pillar 140 adapted for supporting a conventional shoulder belt retractor, not shown, adjacent its base. Each shoulder belt is guided upwardly from the retractor within the confines of a guide channel portion 142. The right and left pillars are connected at their upper ends by a horizontal tie bar 144. Each pillar lower portion is secured in flatwise abutment, as by welding, to angled portion 132 of its associated sheet metal gusset closure member 130. A cutout portion 146 in the cross beam front flange 45 is sized to receive an intermediate portion of the pillar 140 for welded connection therein.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A rear body support arrangement for an open top vehicle body enclosing a passenger compartment defined in part by a front floor pan ending in a kick-up panel connected to an elevated rear floor pan, and opposed right and left rear inboard wheelhouse panels, the support arrangement comprising:

an upper inboard portion of each said right and left wheelhouse panel being formed with a recessed step, said steps define opposed riser portions with each riser portion having a lower edge thereof terminating in an inboard extending tread portion;

a cross beam comprising an upper horizontal elongated gusset panel having front and rear transverse edges with each edge defined by a downstanding flange, each said front and rear flange being welded to respective upper portions of front and rear gusset panels downstanding from said upper gusset panel;

said upper gusset panel terminating in outboard right and left connector portions welded together with an associated wheelhouse panel, each connector portion formed with an upstanding shroud comprising a generally rectangular top panel in spaced overlying relation to an associated tread portion, each shroud defined by fore and aft downstanding side walls together with a downstanding inboard wall, each top panel having an outboard extending cap flange attached, in an overlying face-to-face manner, to an outboard planar portion of its associated wheelhouse panel;

each said shroud and its tread and riser portions defining a box-shaped stiffener enclosing a plurality of upstanding spacer members confined between an associated top panel and tread portion, each said stiffener adapted for transmitting an associated rear suspension strut load to said cross beam, by means of a strut fastener securing each stiffener spacer member.

2. The vehicle body support arrangement as set forth in claim 1 wherein said front and rear gusset panels each have a lower horizontally extending flanged end welded to an underlying portion of the rear floor pan, whereby said upper, front, and rear gusset panels, together with the underlying portion of said rear floor pan, define a closed-section cross beam.

3. The vehicle body support arrangement as set forth in claim 1 wherein a plurality of aligned openings is formed through each said top panel together with its associated spacer member and tread portion, and each said strut fastener is positioned through complementary aligned openings in its associated tread portion, spacer member, and top panel and respective nuts are threaded on each strut fastener, thereby mounting an associated rear strut assembly upper end portion to a wheelhouse inner panel.

4. The vehicle body support arrangement as set forth in claim 2 wherein said cross beam front gusset panel has an upper edge ending in a forwardly extending doubler panel which is in underlying welded attachment to an undersurface of said upper gusset panel bight portion, and said doubler panel terminates in a downstanding backing flange which is in welded attachment to an interior surface of said upper gusset panel front flange.

5. The vehicle body support arrangement as set forth in claim 2 wherein a pair of right and left double-L cross section reinforcement brackets, each said bracket in conforming exterior backing relation to its associated wheelhouse panel riser and tread portions, are together with an upper outboard extending wheelhouse panel backing portion and a lower downwardly extending wheelhouse panel backing portion.

6. The vehicle body support as set forth in claim 3 wherein said plurality of spacer members are in the form of a pair of cylindrical hollow steel sleeves symmetrically positioned on either side of an associated strut member axis, each spacer sleeve having its upper end welded to an undersurface of its associated shroud top panel and its lower end being urged into flush contact with an upper surface of its associated tread portion upon a respective nut being threadably tightened on its associated stud fastener.

7. The vehicle body support arrangement as set forth in claim 6 wherein each said strut fastener is positioned through complementary aligned openings in its associated reinforcement bracket.

* * * * *